United States Patent [19]
Dyer

[11] 3,905,132
[45] Sept. 16, 1975

[54] HIDDEN KNOWLEDGE DETECTOR
[75] Inventor: Frederick N. Dyer, Altamonte Springs, Fla.
[73] Assignee: The United States of America as represented by the Secretary of the Navy, Washington, D.C.
[22] Filed: Nov. 7, 1974
[21] Appl. No.: 521,987

[52] U.S. Cl. .............................................. 35/22 R
[51] Int. Cl.² ........................................ G09B 19/00
[58] Field of Search .................. 35/22, 21, 9 A, 8 A

[56] References Cited
UNITED STATES PATENTS
| | | | |
|---|---|---|---|
| 2,959,871 | 11/1960 | Honkavaara | 35/22 R |
| 3,060,795 | 10/1962 | Corrigan et al. | 35/22 R X |
| 3,747,228 | 7/1973 | Yamamoto | 35/8 A |
| 3,755,922 | 9/1973 | Clynes | 35/22 R |
| 3,775,864 | 12/1973 | Bisinger | 35/9 A |
| 3,782,006 | 1/1974 | Symmes | 35/22 R |

Primary Examiner—Wm. H. Grieb
Attorney, Agent, or Firm—Richard S. Sciascia; John W. Pease

[57] ABSTRACT

Apparatus for identification and assessment of specific interests and knowledge of an individual comprising a display medium, projection screen or television for example, and an image generator, such as a slide projector, for presenting to a testee, for immediate recognition of color only, a series of word-color combinations in rapid order, the projector being adapted to present slides in selected sequence to prevent memory recognition and sequential color repetition, and an elapsed time recording mechanism for recording the testee's response time for recognition of the color presented with the potential interference factor of specific interest and/or knowledge of the word image simultaneously presented.

6 Claims, 4 Drawing Figures

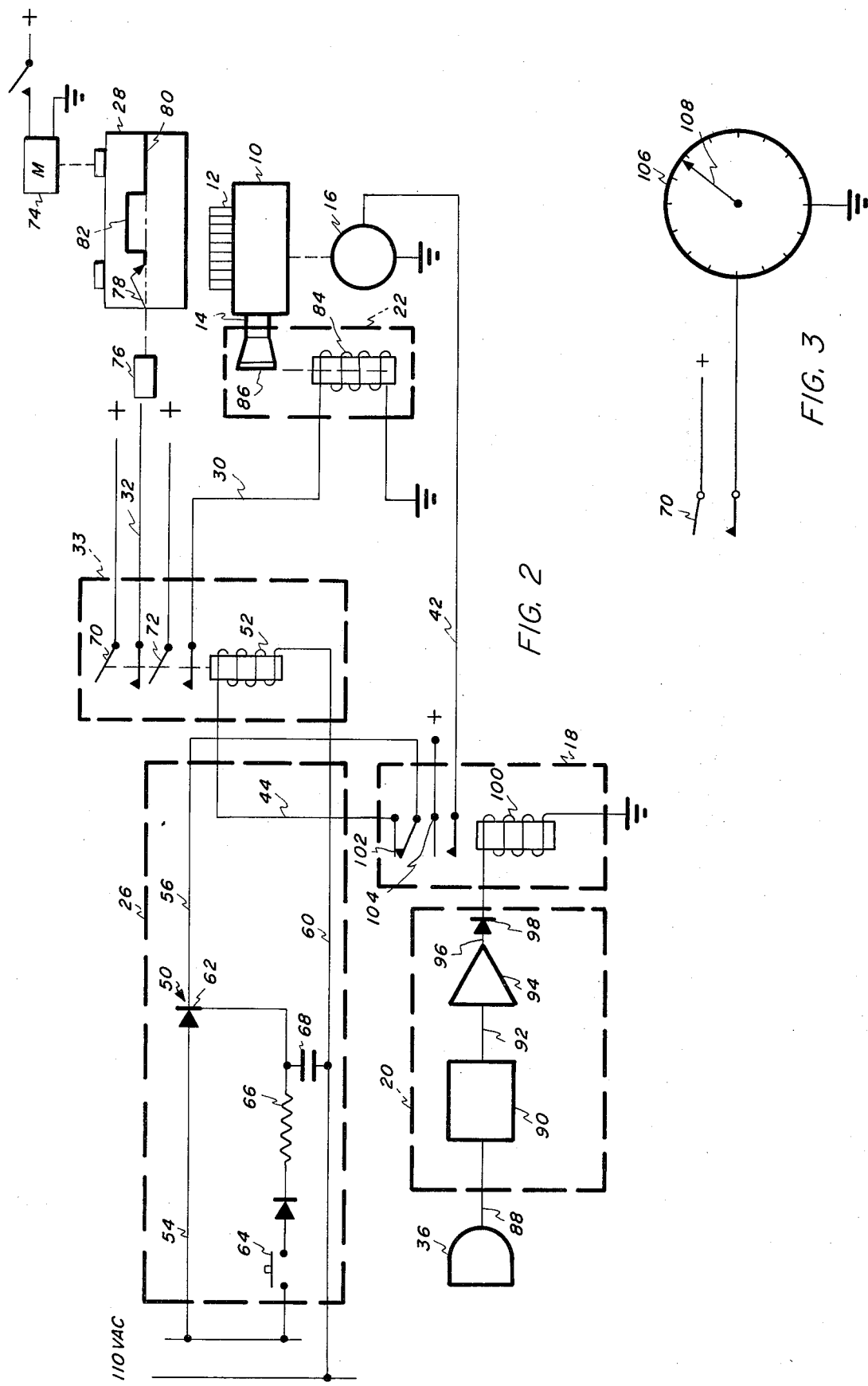

HIDDEN KNOWLEDGE DETECTOR

BACKGROUND OF THE INVENTION

The invention relates to the field of hidden knowledge detection in the areas of psychology, criminal investigation and social science and to apparatus and methods for such information detection. The invention relates to a limited extent to lie detection but encompasses also the more general area of measurement of covert mental processes with additional implications for psychiatry, personnel selection, detection of areas of hidden knowledge or information and other factors.

Under conventional practice the polygraph or lie detector has been used as an aid in judging the truth of statements made by a testee. However, such detectors depend upon relatively slow physiological responses, particularly changes in skin resistance, and require considerable time between presentations of critical stimuli. Conventional pencil and paper personality tests are very general in the information they provide. Further, such tests also take considerable time to complete and can be faked with a minimal knowledge of the scoring procedures.

It is desirable and an end result of the subject invention to provide apparatus and method which will bring out hidden knowledge against the will of the testee, which can be employed to get specific rather than general information, which is more rapid in test time required, more reliable and in which the response time is sufficiently small such that there is not opportunity to resist the disclosure of true data.

SUMMARY OF THE INVENTION

In accordance with the invention a display means, as for example a screen, is provided and utilized in connection with a color-image generator, as for example a multiple color slide projector and is placed under the control of a timer for measuring elapsed projection time and control circuit means for activating the projector and the timer to present a color word-image to a testee and including deactivating means voice-responsive to stop the image projection and the timer whereby when the testee is asked to identify the color only, additional time delay factors which result from the testee having a specific interest, knowledge or involvement with the word simultaneously presented will indicate by such time delay in response the fact and extent of pertinence, i.e., knowledge, interest, etc.

DESCRIPTION OF THE DRAWINGS

FIG. 2 is an electrical circuit showing details of the system of FIG. 1;

FIG. 3 is a schematic of an alternative timer to a timer shown in FIGS. 1 and 2.

DESCRIPTION OF THE PREFERRED EMBODIMENTS

In accordance with the invention, apparatus is provided whereby a set of critical words plus non-critical "control" words are randomly mixed and presented one-by-one is one of a number of easily nameable colors. The person under interrogation is instructed to name the color of the word as quickly as possible and to ignore the word. However, it is not possible because of the characteristics of human attentional systems to completely ignore the word and the implicit reading activity delays the color naming response by a small amount. The amount of delay is related to how meaningful the word is for the person. For example, if the words in the critical set dealt with a specific crime (its location, the weapon, characteristics of the victim, etc.), a person with knowledge of the crime would show longer delays in naming the color of these words than a person without such knowledge. Stimulus words can be presented very quickly with this procedure and a rate of 30 per minute was used in the study that found drug abusers to take longer to name the colors of drug jargon than to name the colors of control words. Persons who were not drug abusers (or at least were not known to be drug abusers) showed much less delay on drug jargon relative to control words and also smaller delays for color naming overall.

Figure 1:
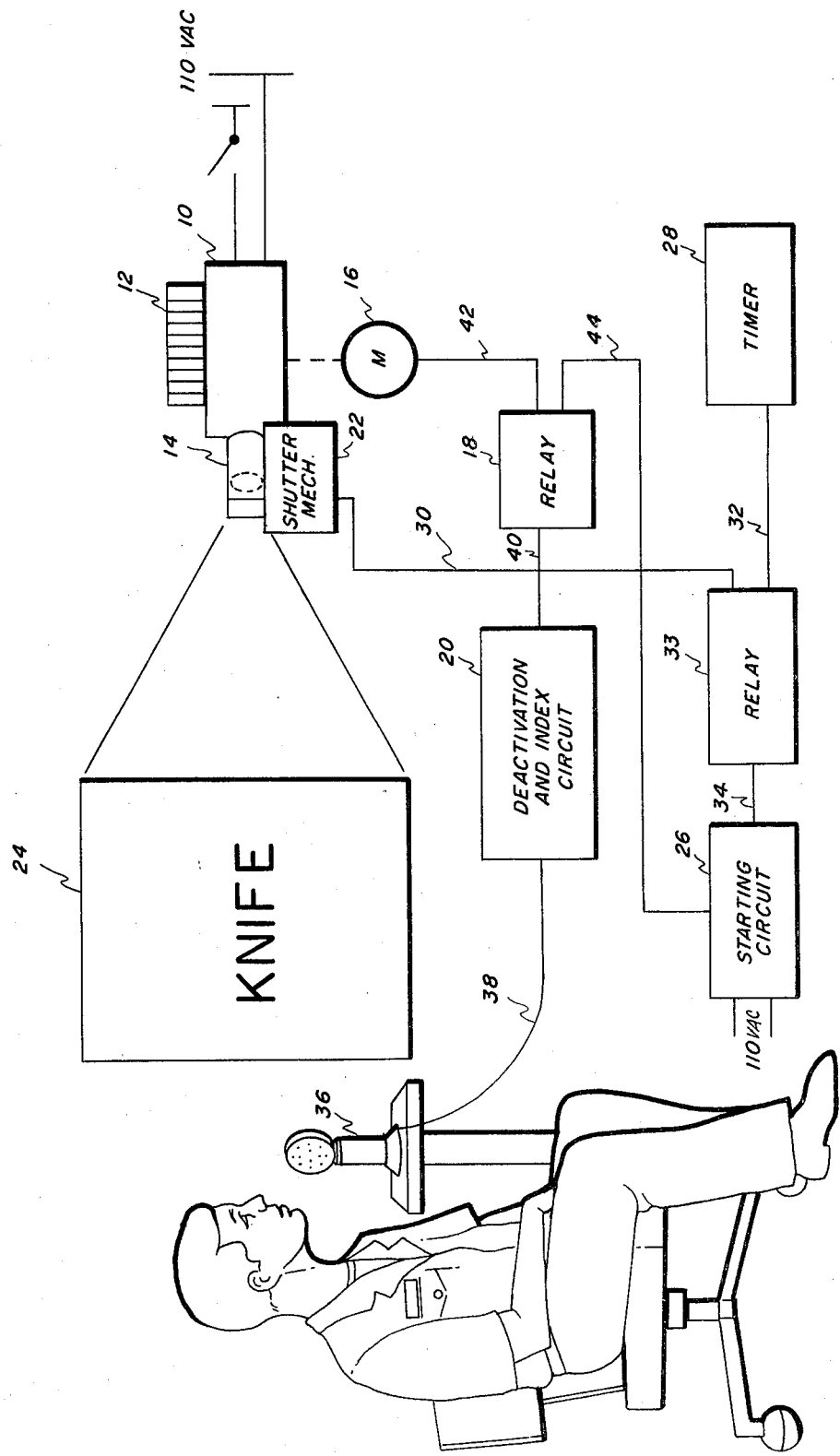
FIG. 1 is a block diagram schematic of one electro-optical system of apparatus incorporating the invention.

Referring to FIG. 1 there is shown therein schematically one suitable apparatus incorporating the invention. In FIG. 1 an image generator in the form of a turret type slide projector 10 capable of holding in selected arrangement a plurality of colored slides 12 for rotation and presentation to a lens system 14 of the projector, is connected for index drive by a step motor 16 from a relay 18 via a deactivation and indexing circuit 20. The lens system 14 is combined with a shutter mechanism 22 which in closed position interrupts an image ray projectable between the slide projector 10 and a backlighted display screen 24. In open position of the shutter mechanism 22 the image ray is passed to the screen 24.

A starting circuit 26 is provided to initiate the projection of a color-word on the screen 24 and to start a timer 28 simultaneously responsive to manual operation of the starting circuit by the testor. The shutter mechanism and the timer are connected to the starting circuit through a lock-in relay 33 by lines 30 and 32 and thence to the starting circuit by a line 34 as indicated. The deactivation and index circuit 20 is connected to a microphone 36 via line 38, to the relay 18 via a line 40 and from the relay 18 to the motor 16 via a line 42 and to the starting circuit 26 via a line 44. The deactivation and index circuit is responsive to voice actuation from the microphone 36 to interrupt the starting circuit and by thus deenergizing the relay 33 to close the shutter mechanism 22 to interrupt the image presentation. At the same time and by the same means the timer 28 is deenergized to record elapsed time of trainee response. Circuit 20 also acts through relay 18 and motor 16 responsive to a voice cue from microphone 36 to index the projector to the next slide of the series of slides to be projected.

To understand the details of circuitry of FIG. 1 a simplified circuit of elements suitably arranged is shown. Thus, in FIG. 2 the starting circuit comprises an SCR 50 connected in series between a voltage source indicated and a coil 52 of the relay 33 by lines 54, and 56, normally closed switch 102 and lines 44 and 60. SCR 50 is conditioned to pass current to the relay coil 52 by voltage bias applied to the base 62 of the SCR 50 via a starting switch 64 and RC network comprising resistor 66 and capacitor 68. The SCR is shut off by opening switch 102 of relay 18 by the deactivation circuit 20 as will be described hereinafter. Relay 33, when energized, closes normally open contacts 70 and 72 to start the recording of time on the timer 28 and open the shutter mechanism 22.

The timer 28 shown in FIG. 2 is a recording chart type driven by a drive motor 74 as indicated and including a voltage sensitive scribe 74 having a pen 78 for marking the timer chart 28. Thus, line 80 indicates the time line and zero voltage and the pulse indicated at 82 indicates the time elapsed period during which the contacts 70 were closed. The simultaneous closing of contacts 72 energizes a solenoid coil 84 which moves a shutter 86 downward to open position to allow the passage of image rays from the projector 10.

The deactivation and indexing circuit 20 is provided to end the recording of time on the timer 28, to close the shutter mechanism 22, and to index the projector 10 to the next slide. Thus, in circuit 20 output from the microphone 36 is amplified, rectified and passed via line 88, preamplifier 90, line 92, amplifier 94, line 96 and rectifier 98 to the solenoid coil 100 of relay 18 to open contacts 102 and close contacts 104. Opening contacts 102 interrupts the output on line 44 and shuts off the SCR 50 thereby marking on the timer 28 the end of the elapsed time period and closing the shutter mechanism 22 to prepare for the showing of the next slide. Closing the contacts 104 energizes the step motor 16 via line 42 to index the projector 10 to the next slide.

In summary then the testor closes the momentary contact switch 64 to present the image to the testee and start the clock and the testee interrupts the image, stops the timer and conditions the apparatus for the next image to be shown by his voice response in naming the color of the word image.

It is contemplated that alternative elements could be used. For example, as shown in FIG. 3, a simple stop clock 106 with stop hand 108 could be used in place of the timer 28.

Figure 4:
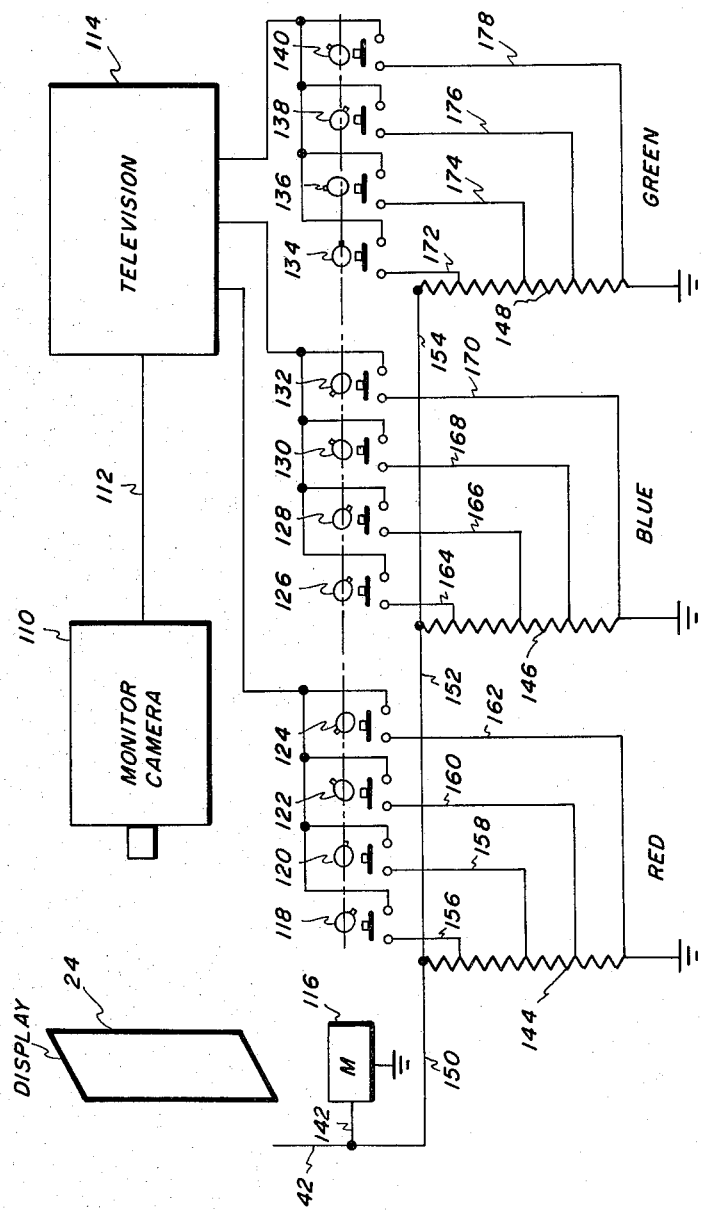
FIG. 4 is a schematic of a modification of the invention adding a monitor, color television and channel control circuit to the apparatus of FIG. 1 to vary word color selectivity via control of the T.V. channel signal strength.

In a further modification of the invention it is contemplated that one may use black and white slides and obtain the colors by varying the application and potential of video signal to the three color channels of a television set used in conjunction with a monitor and a programmable selector circuit. Thus, in FIG. 4 the display screen 24 upon which a word image is projected is monitored by a monitor camera 110 which transmits the video signal via a line 112 to a television display 114. However, the selective application of the video signal to the red, blue and green channels and the relative signal strength applied to each is controlled by a selector and control circuit comprising a stepping motor 116 driving pluralities of cam driven normally open switches 118, 120, 122, and 124 for red, 126, 128, 130 and 132 for blue and 134, 136, 138 and 140 for green, referring to the three T.V. color channels. The motor 116 is supplied from a voltage source (line 42 of relay 17) and via a line 142 and three potentiometers 144, 146 and 148 associated respectively with the red, blue and green channels are supplied from the voltage source indicated via lines 150, 152 and 154. Each potentiometer is connected to ground as indicated and is tapped to an associated switch by the lines 156, 158, 160, 162, 164, 166, 168, 170, 172, 174, 176 and 178 to provide the variations in voltage potential on the switches are selectively closed in accordance with the programmed setting of the cams driving the normally open contacts.

It will be understood that various other changes in the details, materials and arrangements of parts, which have been herein described and illustrated in order to explain the nature of the invention, may be made by those skilled in the art within the principle and scope of the invention as expressed on the appended claims. For example, a computer could be used for generating images in place of the projector 10 and could be programmed to present the images in desired sequence.

What is claimed is:

1. Apparatus for identification of specific interests and knowledge of a testee comprising:
   a. a display means
   b. a color image generator actuable alternately to projecting and interrupting conditions to project to said display means a series of simultaneously displayed word-color combinations in rapid order for testee identification of color only as quickly as possible while said generator is projecting
   c. a timer for measuring time elapsed during each generator projecting condition, and
   d. activation and deactivation circuits connected to condition said generator to projection condition and activate said timer simultaneously and to deactivate both generator and timer upon oral response by said testee to measure and record thereby the time delay in testee's response to each word-color combination displayed for color identification and to thereby evidence any interference factor resulting from specific interest and/or knowledge of the word image presented.

2. Apparatus according to claim 1
   a. said display means comprising a projection screen.

3. Apparatus according to claim 1
   a. said display means comprising a projection screen, a monitor for said screen, a television set connected to said monitor and a plurality of variable voltage switching connected to said television set to selectively vary the voltage applied to the three color guns of the picture tube of said T.V. set to vary the colors in sequentially presented word-color combinations.

4. Apparatus according to claim 1
   a. said image generator comprising a slide projector with a relay operated image shutter for passing and interrupting an image when said relay is energized and deenergized respectively.

5. Apparatus according to claim 4
   a. said activation circuit comprising a manually operable starting circuit and associated first relay connected to condition said projector to image projection condition and to energize said timer
   b. said deactivation circuit comprising a voice responsive circuit including a microphone, amplifier and rectifier means and a second relay connected to deenergize said first relay to interrupt image projection and stop said timer to thereby record the elapsed time of testee reply.

6. Apparatus according to claim 5 including
   a. a stepping motor for indexing slides in said slide projector when energized
   b. said second relay being connected to supply power to said stepping motor when said deactivating circuit is energized responsive to oral response of said testee to condition the apparatus for the next programmed slide.

* * * * *